(12) United States Patent
Liu et al.

(10) Patent No.: US 10,551,571 B2
(45) Date of Patent: Feb. 4, 2020

(54) OPTICAL FIBER CONNECTOR

(71) Applicant: CommScope Telecommunications (Shanghai) Co. Ltd., Shanghai (CN)

(72) Inventors: Bingxin Liu, Shanghai (CN); Liming Wang, Shanghai (CN); Wenyong Fan, Shanghai (CN)

(73) Assignee: COMMSCOPE TELECOMMUNICATIONS (SHANGHAI) CO. LTD. (CN)

( * ) Notice: Subject to any disclaimer, the term of this patent is extended or adjusted under 35 U.S.C. 154(b) by 0 days.

(21) Appl. No.: 15/528,451

(22) PCT Filed: Nov. 20, 2015

(86) PCT No.: PCT/CN2015/095191
§ 371 (c)(1),
(2) Date: Oct. 2, 2017

(87) PCT Pub. No.: WO2016/078613
PCT Pub. Date: May 26, 2016

(65) Prior Publication Data
US 2018/0143381 A1    May 24, 2018

(30) Foreign Application Priority Data

Nov. 20, 2014  (CN) .......................... 2014 2 0700716

(51) Int. Cl.
*G02B 6/38* (2006.01)

(52) U.S. Cl.
CPC ......... *G02B 6/3825* (2013.01); *G02B 6/3894* (2013.01); *G02B 6/3891* (2013.01); *G02B 6/3898* (2013.01)

(58) Field of Classification Search
None
See application file for complete search history.

(56) References Cited

U.S. PATENT DOCUMENTS

| | | | |
|---|---|---|---|
| 5,668,904 | A | 9/1997 | Sutherland et al. |
| 6,579,014 | B2 | 6/2003 | Melton et al. |

(Continued)

FOREIGN PATENT DOCUMENTS

| | | |
|---|---|---|
| CN | 201425637 Y | 3/2010 |
| CN | 201540384 U | 4/2010 |

(Continued)

OTHER PUBLICATIONS

International Search Report and Written Opinion of the International Searching Authority for corresponding International Patent Application No. PCT/CN2015/095191 dated Feb. 26, 2016, 12 pgs.

(Continued)

*Primary Examiner* — Jerry Rahll
(74) *Attorney, Agent, or Firm* — Merchant & Gould P.C.

(57) ABSTRACT

This invention discloses a type of optical fiber connector, comprising: an adapter body with a first locking component; an extending raised edge which surrounds the said adapter body, that raised edge possessing a first connecting surface; and a locking ring, that locking ring being constructed such that it may be installed around the adapter body, said locking ring possessing a second connecting surface and a second locking component; said first locking component and said second locking component being such that they connect together when said locking ring is rotated by an angle of 90 degrees or less than 90 degrees relative to the adapter main body, thus allowing positioning of the first connecting surface at a pre-set distance from second connecting surface.

20 Claims, 12 Drawing Sheets

(56) References Cited

U.S. PATENT DOCUMENTS

| | | |
|---|---|---|
| 6,648,520 B2 | 11/2003 | McDonald et al. |
| 6,899,467 B2 | 5/2005 | McDonald et al. |
| 7,044,650 B1 | 5/2006 | Tran et al. |
| 7,137,742 B2 | 11/2006 | Theuerkom et al. |
| 7,146,090 B2 | 12/2006 | Vo et al. |
| 7,207,727 B2 | 4/2007 | Tran et al. |
| 7,244,066 B2 | 7/2007 | Theuerkorn |
| 7,264,402 B2 | 9/2007 | Theuerkom et al. |
| 7,568,844 B2 | 8/2009 | Luther et al. |
| 7,572,065 B2 | 8/2009 | Lu et al. |
| 7,654,747 B2 | 2/2010 | Theuerkom et al. |
| 7,744,288 B2 | 6/2010 | Lu et al. |
| 9,304,262 B2 | 4/2016 | Lu |
| 2008/0175546 A1 | 7/2008 | Lu et al. |
| 2010/0215322 A1* | 8/2010 | Matsumoto .......... G02B 6/3879 385/78 |

FOREIGN PATENT DOCUMENTS

| | | |
|---|---|---|
| CN | 101820118 A | 9/2010 |
| CN | 103278890 A | 9/2013 |
| CN | 204359965 U | 5/2015 |
| EP | 1 020 743 A2 | 7/2000 |
| EP | 2 302 431 A1 | 3/2011 |
| EP | 2 354 825 A1 | 8/2011 |
| WO | 2015/197588 A1 | 12/2015 |
| WO | 2016/206594 A1 | 12/2016 |

OTHER PUBLICATIONS

Extended European Search Report for corresponding European Patent Application No. 15860861.2 dated Jun. 8, 2018, 8 pages.

\* cited by examiner

Firgure 3

OPTICAL FIBER CONNECTOR

CROSS-REFERENCES TO THE APPLICATION IN QUESTION

This Application is a National Stage Application of PCT/CN2015/095191, filed on 20 Nov. 2015, which claims benefit of Serial No. 201420700716.8 filed on 20 Nov. 2014 in China and which applications are incorporated herein by reference. To the extent appropriate, a claim of priority is made to each of the above disclosed applications.

TECHNICAL FIELD

In overall terms, this disclosure relates to a type of connector system, more specifically an optical fibre connector of a type of connector system.

PRIOR ART

Optical cables are widely used for the transmission of optical signals thus allowing high speed transmission of data. Optical cables generally comprise: one or more optical fibres, one or more buffer components surrounding the optical fibres, a reinforced layer surrounding said one or more buffer components and an external protective cover. Optical fibres are for the purpose of carrying optical signals. A typical optical fibre includes an internal core component surrounded by an encapsulating layer, the encapsulating layer being covered by a coating layer. Said buffer component (either a loose or tight buffer tube) is used to enclose and protect the coated optical fibre. The reinforced layer increases the mechanical strength of the optical cable, thus preventing strain being exerted on the optical fibre during installation or during subsequent processes. Examples of reinforced layers include aramid yarn, steel and epoxy reinforced glass roving. The external protective cover prevents damage due to crushing, abrasion and other physical damage. The external protective cover also prevents chemical damage (for instance by ozone, alkalis or acids).

Optical cable connector systems are useful in allowing in-situ connection and disconnection of optical cables where splicing is not necessary. A typical optical cable connector system connecting two optical cables includes optical fibre connectors installed at the ends of the optical cables, and an adapter that couples the optical fibre connectors together both optically and mechanically. Optical fibre connectors typically consist of an insertion core which supports the optical cable at its end. Typically, the end surface of the insertion core is at an angle and polished. The adapter includes a coaxial alignment port (such as a socket) capable of containing the optical fibre connectors requiring connection. The adapter includes an internal sleeve tube; when the connector is inserted into the said port of the adapter, said internal sleeve tube accommodates and aligns with the insertion core of the said optical fibre connector. When the insertion core and the optical fibre with which it is connected are aligned correctly within the sleeve tube of the optical fibre adapter, the optical fibre signal can be transmitted from one optical fibre to the next optical fibre. Typically, adapters also include mechanical securing devices to ensure that the optical fibre connector is mechanically retained within the adapter.

Typically, the housing wall of an MST or OTE housing (enclosure) in the adapter is captured by a raised edge on the adapter for instance in an arrangement such as a threaded nut fixing, the optical fibre connector system being installed within the housing by passing through an opening of a suitable size. The interaction between the raised edge of the adapter and the nut compresses a component, for instance a sealing "O" ring, thus achieving a sealed connection.

Our intention was to improve the optical fibre connector system.

SCOPE OF THE INVENTION

According to one aspect of this invention, it provides a type of connector system, which consists of: an adapter body with a first locking component; an extending raised edge which surrounds the said adapter body, that raised edge possessing a first connecting surface; and a locking ring, that locking ring being constructed such that it may be installed around the adapter body, said locking ring possessing a second connecting surface and a second locking component; said first locking component and said second locking component being constructed such that they connect together when said locking ring is rotated by an angle of 90 degrees or less than 90 degrees relative to the adapter body, thus allowing the positioning of the first connecting surface at a pre-set distance from the second connecting surface.

According to one illustrative embodiment of this invention, the adapter body is more or less cylindrical, the first locking component possessing a first protruding locking section and second protruding locking section extending radially from the adapter body.

According to one illustrative embodiment of this invention, the first locking component includes a first locking surface.

According to one illustrative embodiment of this invention, the second locking component includes a second locking surface being constructed such that it may connect with the first locking surface.

According to one illustrative embodiment of this invention, the second locking surface includes a first section at an angle to the second connecting surface and a second section that is parallel to the second connecting surface.

According to one illustrative embodiment of this invention, said second locking surface includes a stepped section between said first section and said second section.

In one illustrative embodiment of this invention, the connector system further includes a ribbed section adjacent to said stepped section, said ribbed section extending radially inwards into the central opening of said locking ring.

According to one illustrative embodiment of this invention, the connector system further includes a sealing component contained within said adapter body.

According to one illustrative embodiment of this invention, said locking ring delimits the central opening of said adapter body contained therein, while the second locking component protrudes radially inwards into said central opening.

According to one illustrative embodiment of this invention, the central opening of the locking ring is delimited by an axial slot constructed such that it contains said first locking component.

According to another aspect of this invention, it provides a type of connector system, which consists of: an adapter body that possesses a first end section and a second end section; a raised edge that surrounds the first end section of the said adapter body; a first locking component, said first locking component extending from the second end section of said adapter body and possessing a first locking surface; a locking ring, said locking ring possessing a central opening delimited by an axial slot, said axial slot being constructed such that it contains said first locking component; and a second locking component, said second locking component extending into said central opening and being constructed such that it connects with the second locking surface of said first locking surface.

According to one illustrative embodiment of this invention, this connector system further includes: a first connecting surface delimited by said raised edge; a second connecting surface delimited by said locking ring; wherein, said first locking component and said second locking component are positioned such that they connect together when said locking ring is rotated by an angle of 90 degrees or less than 90 degrees relative to the said adapter body, their connection allowing the positioning of the said first connecting surface at a pre-set distance from the said second connecting surface.

According to one illustrative embodiment of this invention, the adapter body is more or less cylindrical, the first locking component possessing a first protruding locking section and a second protruding locking section extending radially from the adapter body.

According to one illustrative embodiment of this invention, said locking ring delimits a central opening, and additionally the second locking component includes a first protruding locking section and a second protruding locking section extending radially into said central opening.

According to one illustrative embodiment of this invention, this connector system further includes an installation tool, said installation tool comprising: a body; and a first dowel pin and second dowel pin extending axially from said body, wherein said locking ring delimits a first hole and second hole, the first hole and second hole being such that said first pin and said second pin can fit within them.

According to one illustrative embodiment of this invention, said locking ring possesses a first end section that delimits a connecting surface, and additionally, the second locking surface includes a first section at an angle relative to said connecting surface and a second section parallel to said connecting surface.

According to one illustrative embodiment of this invention, said second locking surface includes a stepped section between said first section and said second section.

According to one illustrative embodiment of this invention, the connector system further includes a ribbed section adjacent to said stepped section, said ribbed section extending radially inwards to the central opening of said locking ring.

According to one illustrative embodiment of this invention, said first locking component includes a first protruding locking section and a second protruding locking section extending radially from said adapter body, and additionally said central opening delimits and is for the purpose of containing the first axial slot and second axial slot of said first protruding locking section and said second protruding locking section.

According to one illustrative embodiment of this invention, the second locking component comprises a first protruding locking section and second protruding locking section extending into said central opening.

DETAILS OF THE EMBODIMENTS

Figure 1:
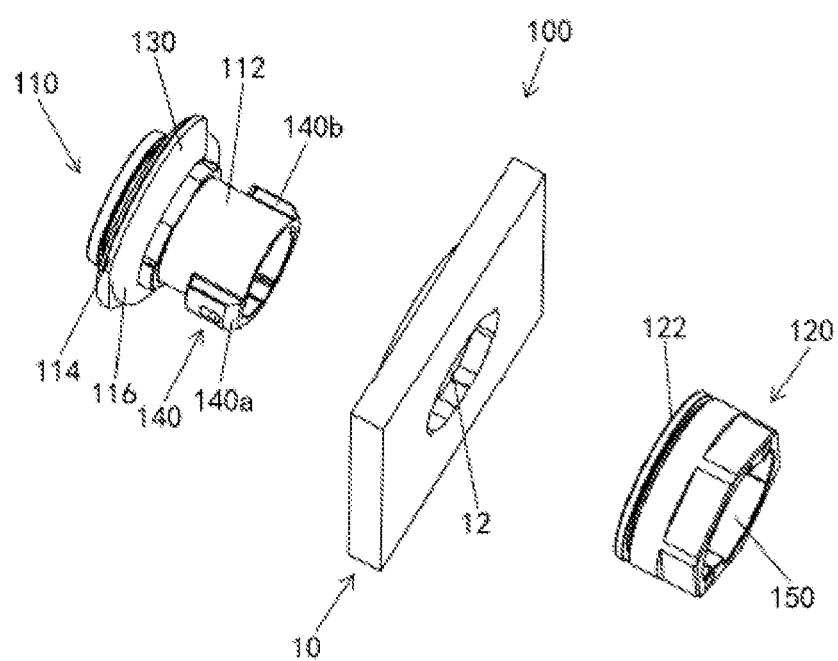
FIG. 1 is a 3-dimensional exploded view of various aspects of one embodiment of the optical fibre connector disclosed here.

In the following detailed description, reference is made to the accompanying drawings which form a part hereof, and the drawings are shown by way of illustration of specific embodiments of the invention. In this respect, where terms such as "top", "bottom", "front" or "back" are used in the description, reference should be made to the drawing or drawings to which they apply. Due to it being possible to orientate the components referred to in the embodiments in a number of different directions, the terms of direction are only used for descriptive purposes, and should not be seen as being in any way restrictive. It should be appreciated that, other embodiments and any modification of the structure or logic without departing from the scope of this invention would be possible. In view of this, the following detailed description should not be understood as restricting the scope of this disclosure.

For instance, the optical cables used in communication are commonly connected to one another using a wide variety of types of connectors. Optical cables are widely used for the high-speed transmission of data via the transmission of optical signals. Optical cables generally comprise: (1) one or more optical fibres; (2) one or more buffer components surrounding the optical fibres; (3) a reinforced layer surrounding said one or more buffer components; and (4) an external protective cover. Optical fibres are for the purpose of carrying optical signals. A typical optical fibre includes an internal core component surrounded by an encapsulating layer, the encapsulating layer being covered by a coating layer. The aforementioned buffer component (either a loose or tight buffer tube) is used to enclose and protect the coated optical fibre. The reinforced layer increases the mechanical strength of the optical cable, thus preventing strain being exerted on the optical fibre during installation or during subsequent processes. Examples of reinforced layers include aramid yarn, steel and epoxy reinforced glass roving. The external protective cover prevents damage due to crushing, abrasion and other physical damage. The external protective cover also prevents chemical damage (for instance by ozone, alkalis or acids).

Optical cable connector systems are useful in allowing in-situ connection and disconnection of optical cables where splicing is not necessary. A typical optical cable connector system connecting two optical cables include optical fibre connectors installed at the ends of the optical cables, and an optical fibre adapter that couples the optical fibre connectors together both optically and mechanically. Optical fibre connectors typically consist of an insertion core which supports the optical cable at its end. Typically, the end surface of the insertion core is at an angle and polished. The optical fibre adapter includes a coaxial alignment port (such as a socket) capable of containing the optical fibre connectors requiring connection. The optical fibre adapter includes an internal sleeve tube; when the connector is inserted into the port of the optical fibre adapter, said internal sleeve tube accommodates and aligns with the insertion core of the said optical fibre connector. When the insertion core and the optical fibre with which it is connected are aligned correctly within the sleeve tube of the optical fibre adapter, the optical fibre signal can be transmitted from one optical fibre to the next optical fibre. Typically, adapters also include mechanical securing devices to ensure that the optical fibre connector is mechanically retained within the adapter.

Figure 2:
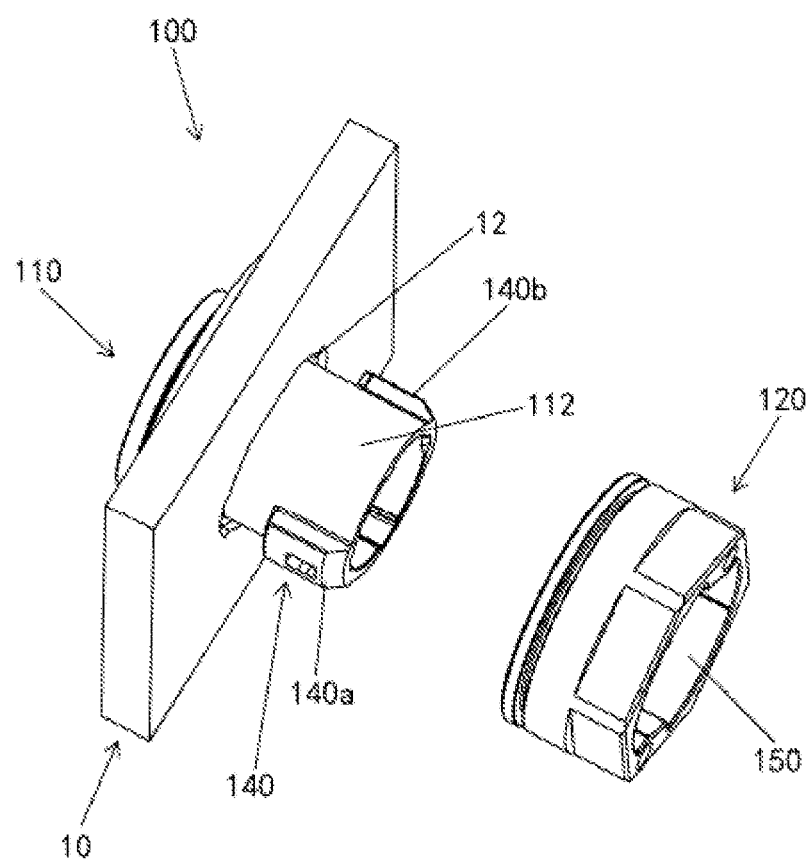
FIG. 2 is another exploded view of the optical fibre connector depicted in FIG. 1.
Figure 3:
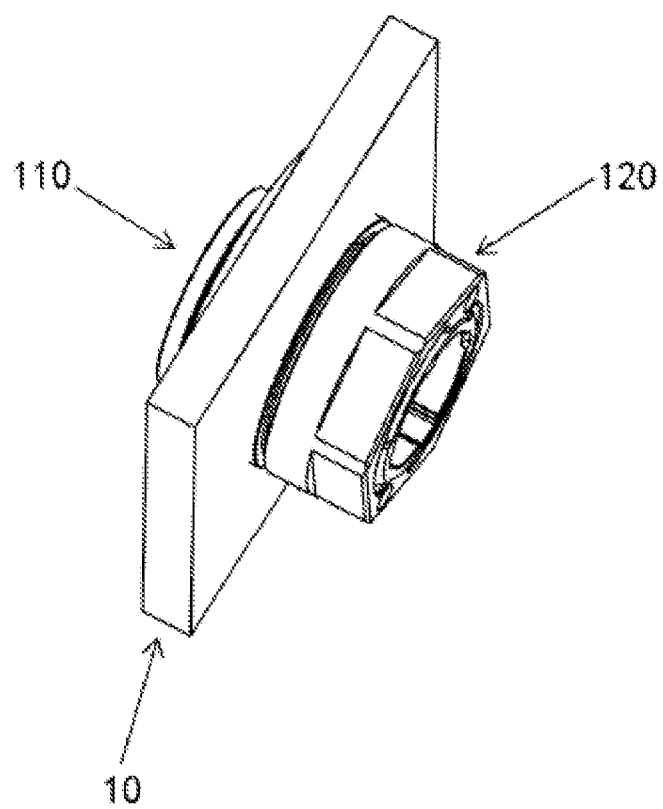
FIG. 3 is a perspective drawing of the components shown in FIG. 1 and FIG. 2 connected together.

FIGS. 1 to 3 show various sections of various aspects of one embodiment of the optical fibre connector system 100 disclosed herein. The system 100 illustrative of this embodiment comprises an adapter 110 with an adapter body 112, the adapter body 112 of the adapter possesses a ring-shaped raised edge 114 surrounding and extending from one end of the adapter body 112. By clamping the wall 10 of a housing such as an MST or OTE housing between the adapter's raised edge 114 and the locking ring 120 of the adapter 110, the connector system 100 depicted in the drawings can be installed onto the opening on the housing. More specifically, the raised edge 114 possesses a first connecting surface 116 for connecting to one side of the housing wall 10, the locking ring possessing a second connecting surface 122 for connecting to the opposite side of said wall 10. In the embodiment shown in the drawing, the interaction between the adapter 110 and the locking ring 120 compresses a sealing component such as an "O" ring 130 between the first connecting surface 116 and said wall 10, thus providing a sealed connection.

Many of the connector systems of the current art rely on a threaded nut, rather than a locking ring 120 such as that shown in the drawing, and when connections are made relying on the current art, the nut is contained within the adapter body by a threaded connection, rotation of the nut tightening the nut on the adapter's raised edge thus compressing the "O" ring. However, due to the general lack of space within the housing, rotation of the nut by a number of turns in order to achieve the intended seal by tightening the nut sufficiently presents difficulties and takes time. Furthermore, it is difficult to determine at what stage the nut has been tightened sufficiently, and generally a torque wrench is required to determine that an appropriate level of torque has been applied.

According to this invention, the adapter body 112 possesses a first locking component 140 extending from the adapter body 112. More specifically, the first locking component 140 of the connector system 100 shown comprises two protruding locking sections 140a and 140b, the protruding locking sections 140a and 140b extending from the end of the cylindrical adapter body 112 opposite to that which possesses the raised edge 114, thus separating the first locking component 140 from the raised edge 114. As shown in FIG. 2, the adapter body 112 is inserted into the housing wall 10 via opening 12, resulting in the "O" ring 130 being positioned between the connecting surface 116 of the raised edge 114 and the surface of said wall 10. As shown in FIG. 3, the locking ring 120 is positioned on the adapter body 112. The locking ring 120 possesses a second locking component 150, that second locking component 150 being constructed such that by partially rotating the locking ring 120 relative to the adapter body 112 bringing it into contact with the first locking component 140 results in the positioning of the first connecting surface 116 at a pre-set distance from the second connecting surface 122. In certain embodiments, the locking ring 120 is rotated less than 360 degrees in order to secure the adapter 110 and seal it to the wall 10; additionally, in the embodiment depicted, rotation of 90 degrees or less allows locking and sealing of the adapter 110.

In other words, it is no longer necessary to rotate a nut repeatedly in order to tighten the adapter so as to compress the "O" ring on the housing, the adapter 110 and locking ring 120 of the system 100 shown in the drawings possessing a first locking component 140 and a second locking component 150, the interaction between the first locking component 140 and the second locking component 150 positions the first connecting surface 116 and the second connecting surface 122, allowing the intended compression of said "O" ring 130 to be achieved, the angle of rotation of the locking ring 120 being less than 90 degrees.

In certain embodiments, the connector system 100 is used to connect external optical cable (for instance, optical cables from external equipment external to the housing) to optical cable within the housing 10. The external optical cable is contained within the adapter 110 and carries the optical signal to the housing 10, the optical fibre connector system 100 allowing that signal to be transmitted from an external optical cable to another optical cable within the housing 10. As a result of this, in certain embodiments, the connector system 100 is hardened or strengthened. Such hardening or strengthening means that the adapter 110 of the connector is suitable for use in outdoor environments. For instance, the "O" ring 130 is compressed in position by the adapter 110 and the locking ring 120, achieving the desired environmental seal, thereby preventing axial and/or radial entry of damp/water. In certain embodiments, the said connector system 100 revealed is used to achieve an IP68 grade seal.

Figure 4:
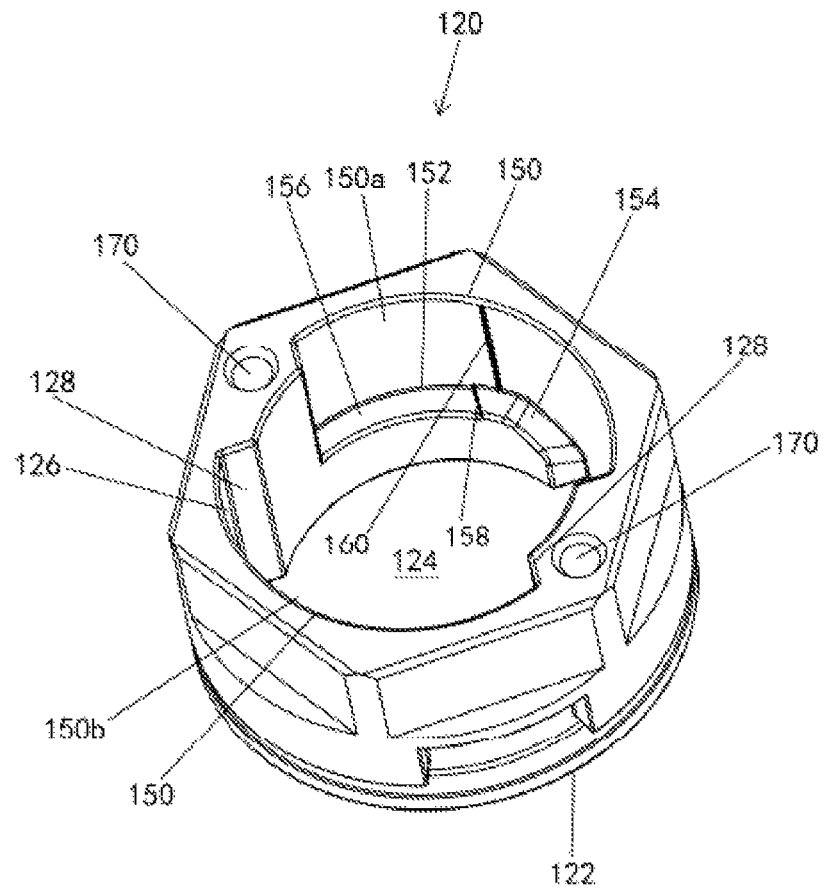
FIG. 4 is a perspective drawing of one embodiment of the locking ring of the optical fibre connector system shown in FIGS. 1 to 3.
Figure 5:
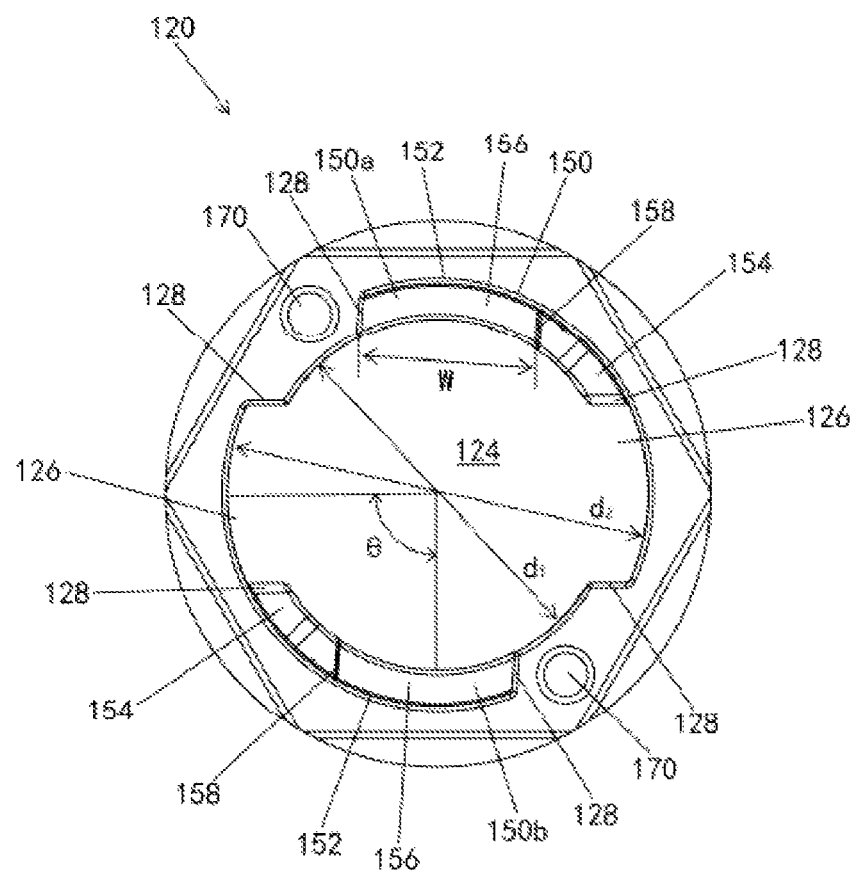
FIG. 5 is an end elevation drawing of the locking ring shown in FIG. 4.
Figure 6:
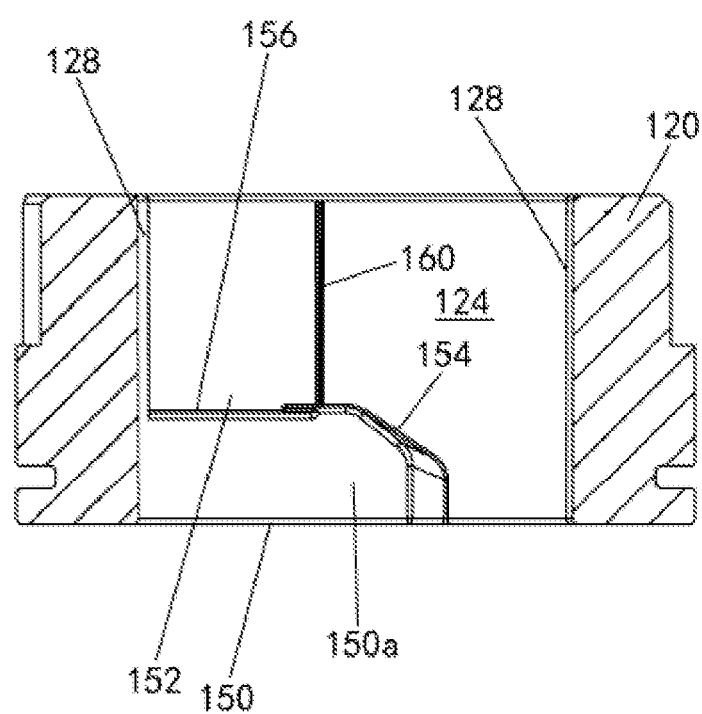
FIG. 6 is a cut-away side view of the locking ring shown in FIG. 4 and FIG. 5.

FIGS. 4 to 6 further depict various aspects of the locking ring 120 shown in FIGS. 1 to 3, FIG. 7 depicting an embodiment of the adapter 110. The locking ring 120 has a central opening 124, that central opening 124 being constructed such that it holds the adapter body 112 shown in FIG. 3. Referring to FIGS. 4 to 6, the second locking component 150 extends into the central opening 124 of the locking ring 120. In the embodiment depicted in the drawings, the locking component possesses a first and second protruding locking sections 150a and 150b, which protrude radially into the central opening 124.

The central opening 124 further delimits a slot 126 extending axially from the connecting surface 122 to the end opposite the locking ring 120. The slot 126 is delimited by the axial side 128 of the protruding locking sections 150a and 150b of the second locking component 150, its size and shape corresponding to that of the protruding locking sections 140a and 140b of the first locking component 140 of the adapter 110. This allows the protruding locking sections 140a and 140b to slide along the slot 126 as the locking ring 120 rotates around the adapter body 112 as shown in FIG. 3. As a result of this, the locking ring 120 rotates relative to the adapter body 110, causing the first locking component 140 of the adapter 110 to come into contact with the second locking component 150 of the locking ring 120.

In the embodiment revealed, each of the protruding locking sections 150a and 150b of the second locking component 150 is delimited by the locking surface 152; when the locking ring 120 is rotated relative to the adapter 110, that locking surface 152 connects with the locking surface 142 corresponding to the protruding locking sections 140a and 140b of the first locking component 140 extending from the adapter body 112. The locking surface 152 comprises an angled or slanted first section 154 and a second section 156 more or less parallel to the connecting surface 122. As a result of this, when the locking ring 120 is rotated, the locking surfaces 142 of the protruding locking sections 140a and 140b of the first locking component 140 connect with the slanted first section 154, as a result of which, as the locking surface 142 slides upwards along the angled first section 154, it causes the connecting surface 116 of the adapter 110 and the connecting surface 122 of the locking ring 120 to move relative to each other in an axial direction. As the locking ring 120 continues to rotate, the locking surface 142 connects with the second section 156. The second section 156 of the protruding locking sections 150a and 150b of the second locking component 150 is axially positioned, allowing the positioning of the first and second connecting surfaces 116 and 122 at pre-set distances from each other. The axial distance between connecting surfaces 116 and 122 depends on the thickness of the wall 10 and the amount of compression required to be exerted on the "O" ring 130.

In the embodiment depicted, the stepped section 158 is located between the second section 156 of the locking surface 152 and the slanting first section 154. When the locking surface 142 of the first locking component 140 rotates relative to the locking ring 120 and passes the angled first section 154, the protruding locking sections 140a and 140b of the first locking component 140 are positioned axially between the axial sides 128 of the stepped sections 158 of the protruding locking sections 150a and 150b of the second locking component. The stepped sections 158 lock the protruding locking sections 140a and 140b of the first locking component 140 in place, and prevent the rotation of the locking ring 120 in the opposite direction. Furthermore, as the protruding locking sections 140a and 140b of the first locking component 140 pass the stepped sections 158 and come into contact with the second section 156 of the locking surface 152, the "clicking" (snapping) that occurs provides an indication to the operator that the locking ring 120 has already been sufficiently rotated to cause it to lock into position.

Furthermore, in the embodiment shown in FIGS. 4 to 6, the ribbed section 160 extends radially inwards into the central opening 124. The ribbed section 160 is positioned such that it is adjacent to each of the stepped sections 158 of the locking surface 152, extending axially along the central opening 124. When the protruding locking sections 140a and 140b of the first locking component 140 pass through the ribbed section 160, the force required to rotate the locking ring 120 is reduced, giving further indication to the operator that installation is complete. Once the locking surface 142 of the first locking component 140 has already connected with the second section 156 of the locking component 150, the ribbed section 160 is also capable of preventing rotation of the locking ring in the opposite direction.

In certain embodiments, the first locking component 140 and second locking component 150 of the adapter 110 and locking ring 120 both extend around 1.5 mm. As a result of this, the protruding locking sections 140a and 140b of the first locking component 140 both extend radially outwards from the adapter body 112 by around 1.5 mm, while the protruding locking sections 150a and 150b of the second locking component 150 extend radially into the central opening 124 by around 1.5 mm. As depicted in FIGS. 4 to 6, the central opening 124 is such that it has a first diameter d1 of around 14.5 mm delimited by the internal surfaces of the protruding locking sections 150a and 150b of the second locking component 150, while the internal surface of slot 126 delimits a second diameter d2 of around 17.5 mm. The second section 156 of locking component 150 delimits a width w of around 7.3 mm.

The first locking component 140 and second locking component 150 are arranged such that locking surface 142 connects with the second section 156 of locking surface 152, as a result of which, when locking ring 120 is rotated by a certain locking angle θ the locking ring 120 becomes locked in position relative to the adapter 110. In certain embodiments, the locking rotation angle θ is less than 360 degrees. In certain embodiments, the locking ring 120 becomes locked at an angle of rotation of less than 90 degrees, and in the embodiment shown in the drawings, the locking angle θ is around 85 degrees to 87 degrees.

Figure 7:
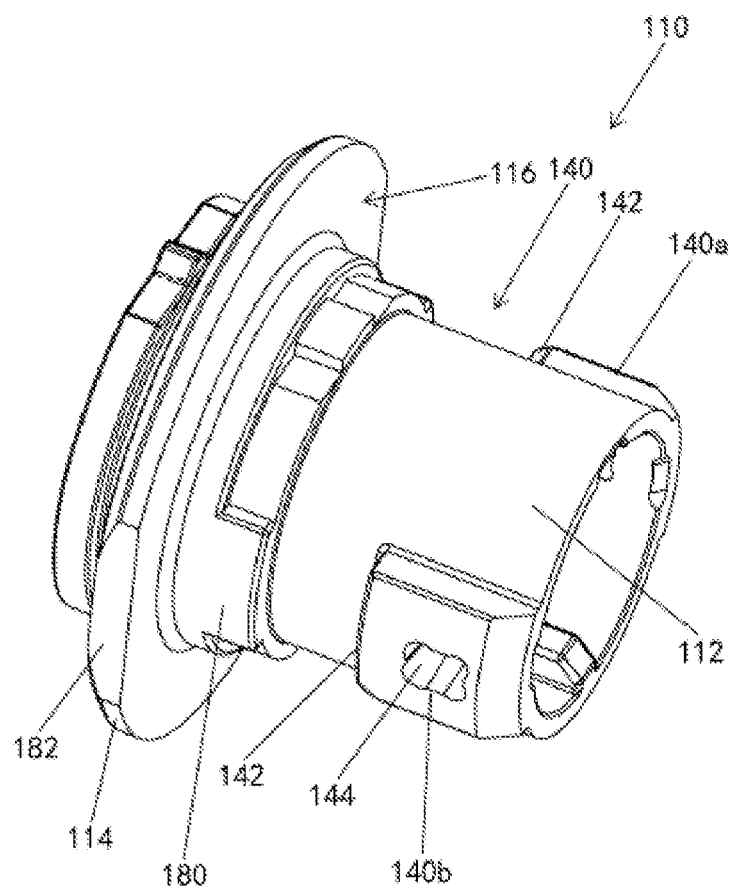
FIG. 7 is a perspective drawing of one embodiment of the adapter of the optical fibre connector system shown in FIGS. 1 to 3.
Figure 8:
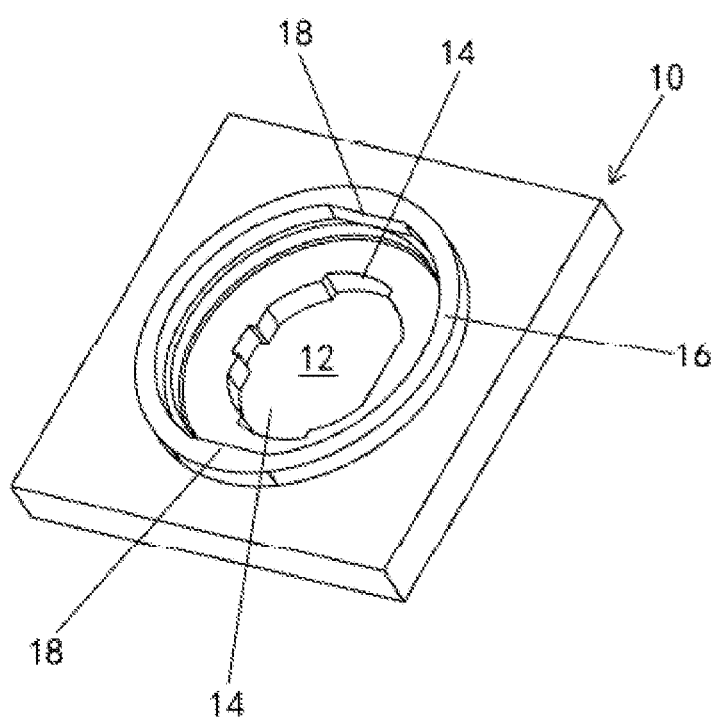
FIG. 8 is a partial perspective drawing of the optical fibre housing shown in FIGS. 1 to 3.
Figure 9:
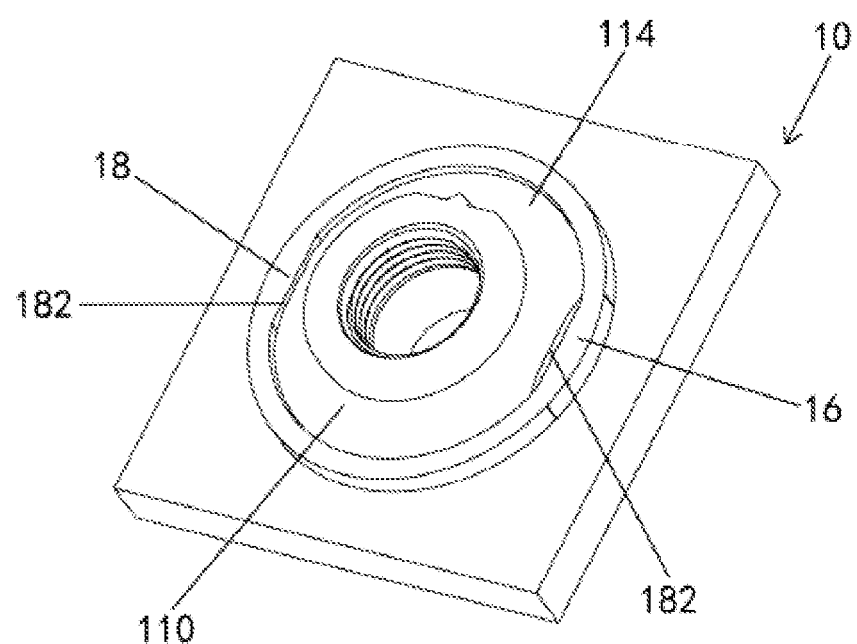
FIG. 9 is a perspective drawing of the part of the optical fibre housing shown in FIG. 8 which accommodates the adapter shown in FIG. 7.

Referring to FIGS. 7 to 9, the adapter 110 includes a module that locks the adapter 110 in position within the housing 10 and that prevents the adapter 110 from rotating once the locking ring 120 of the adapter has been rotated into position. Key 180 extends beneath the raised edge 114 of the adapter body 112. Furthermore, raised edge 114 delimits two flat sections 182 on its opposite side. Key 180 is contained within the slot 14 formed by the opening 12 extending through the housing 10. In the embodiment shown in FIGS. 7 and 8, the opening 12 is enclosed by the sleeve ring 16 extending across the external surface of the housing 10. The sleeve ring 16 delimits the flat section 18 that interacts with the flat section 182 of the raised edge 114. When the adapter 110 is inserted into the opening 12, the "O" ring 130 is positioned between the connecting surface 116 of the raised edge 114 and the wall of the housing 10. Due to the sleeve ring 16 extending from the housing 10, it is not possible to see the "O" ring 130 from the side, and additionally, the capacity of the seal of the connector system 100 to resist lateral loading is improved.

Figure 10:
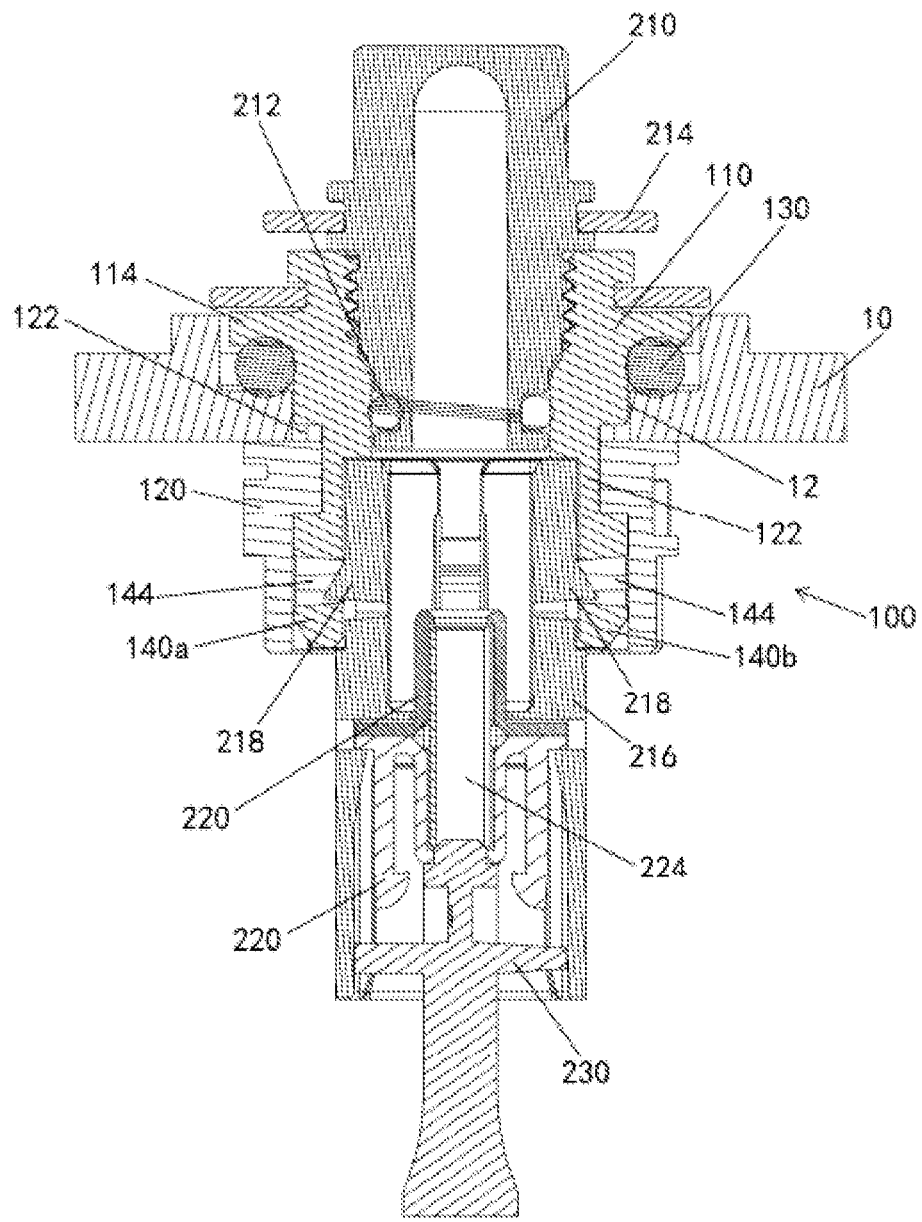
FIG. 10 provides a further sectional view of the various aspects of an embodiment of the optical fibre system disclosed herein.

FIG. 10 is yet another sectional view showing various aspects of the connector system 100. As mentioned above, in certain embodiments of this connector system 100, it is arranged in a manner allowing connection of optical cables. In the embodiment shown in FIG. 10, the locking ring 120 interacts with the adapter 110 to tightly secure the connector system 100 within the opening 12 in the housing 10. The "O" ring 130 is compressed between the connecting surface 116 of the raised edge 114 and the outer side wall of the housing 10, the connecting surface 122 of the locking ring 120 connecting with the inner side wall of the housing 10. As shown in the drawings, where the locking ring 120 has already been rotated until the first locking component 140 and second locking component 150 connect, the connecting surfaces 116 and 122 are positioned at a pre-set distance allowing satisfactory compression of the "O" ring 130.

The first end of the adapter 110 contains a dust cap 210, that dust cap 210 being sealed by the "O" ring 212.

In this manner, the adapter 110 remains sealed until the adapter is used to connect the housing 10 to external optical cables, and as such, it is possible to include a dust cap strap 214 to retain the dust cap 212. The adapter body 112 contains an internal adapter 216, that internal adapter 216 possessing a protruding section 218 extending through the opening 144 of the protruding locking sections 140a and 140b of the first locking component 140. One end of the internal adapter 216 is contained within the retention sections 220 and 222 of the retention sleeve tube 224, the opposite end of said internal adapter containing the optical fibre connector 230.

Figure 11:
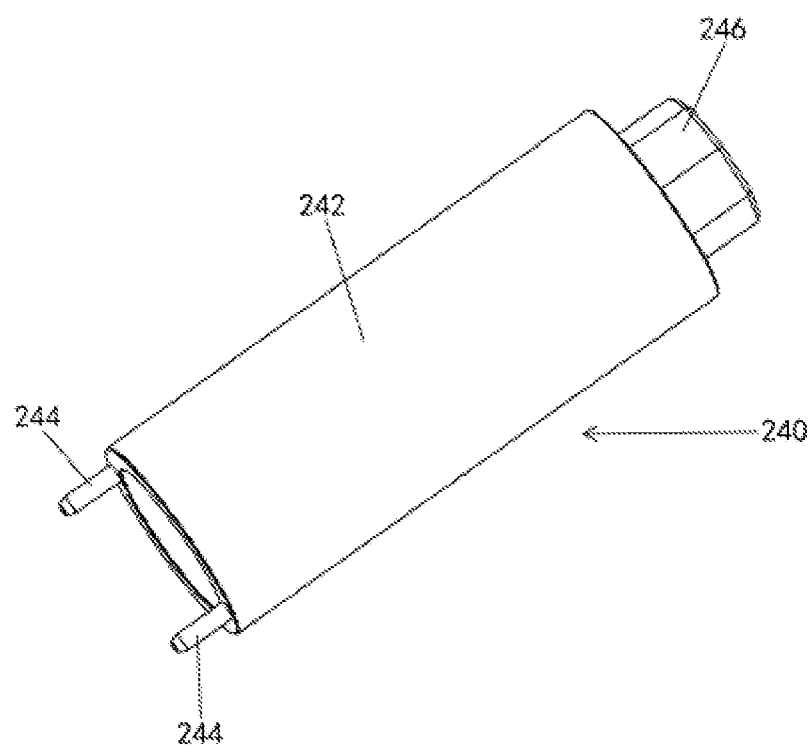
FIG. 11 is a perspective drawing of the various aspects of an embodiment of the installation tool disclosed herein.

Referring back to FIGS. 4 and 5, the locking ring 120 possesses a hexagonal shape making rotation of the locking ring 120 convenient using a spanner. For convenience of installation in restricted spaces, holes 170 extend axially into the end of the locking ring 120 opposite to the connecting surface 122. These holes 170 are provided such that the dowel pins of installation tool 240 fit into them. FIG. 11 depicts an embodiment of the installation tool 240, that installation tool 240 comprising a cylindrical body 242 with dowel pins 244, those dowel pins 244 extending axially from the cylindrical body 242. The dowel pins 244 are constructed such that they fit into holes 170 in the locking ring 120. The hexagonal end section 246 is designed in relation to the dowel pins 244 in a manner that, when the dowel pins 244 are fitted into the holes 170, a spanner can be used to rotate the installation tool 240 and the locking ring 120.

Figure 12:
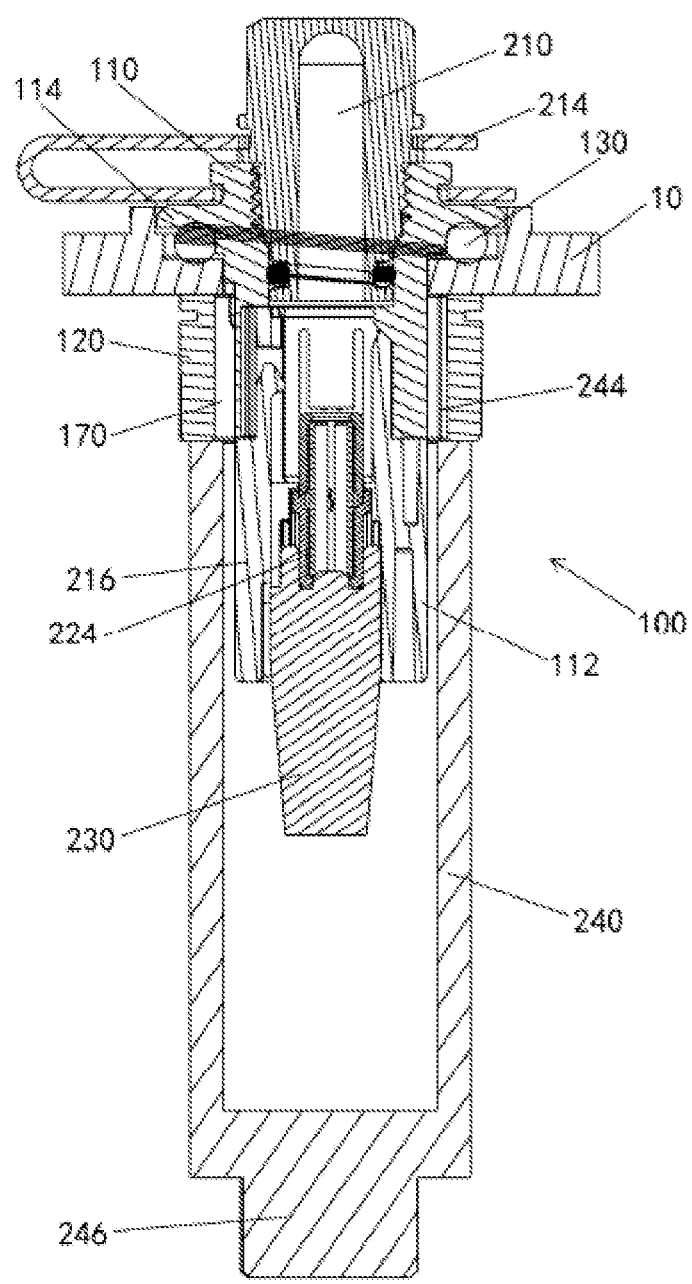
FIG. 12 is a sectional view of the installation tool shown in FIG. 11 connected to the optical fibre connector system shown in FIG. 10.

FIG. 12 is a sectional view of the connector system 100, wherein the installation tool 240 has already been connected to the locking ring.

More specifically, the cylindrical body 242 delimits the opening 248 capable of containing the internal adapter 216. The dowel pins 244 are fitted into the holes 170, in order to allow rotation of the installation tool 240 to rotate the locking ring 120.

Various modifications and alternative embodiments of the present disclosure will be apparent to those skilled in the art without departing from the scope and spirit of the present disclosure, and it is to be understood that the scope of this invention should not be unduly restricted to the embodiments indicated in the diagrams in this text.

LIST OF COMPONENTS 10 housing wall
12 opening in housing wall
14 slot
16 sleeve ring surrounding opening
100 optical fibre connector system
110 adapter
112 adapter body
114 ring-shaped raised edge
116 first connecting surface
120 locking ring
122 second connecting surface
124 central opening in locking ring
126 slot in locking ring
128 side section of protruding locking section
130 "O" ring
140 first locking component
140a adapter protruding locking section
140b adapter protruding locking section
142 locking surface
150 second locking component
150a protruding locking section of locking ring
150b protruding locking section of locking ring
152 locking surface
154 first slanted section of locking surface
156 second section of locking surface
158 stepped section
160 ribbed section
170 holes in locking ring
180 adapter key
182 flat section of raised edge
210 dust cap
212 "O" ring
214 dust cap strap
216 internal adapter
218 protruding section of internal adapter
220 retention section
222 retention section
224 sleeve tube
230 optical fibre connector
240 installation tool
242 installation tool cylindrical body
244 installation tool dowel pin
246 installation tool hexagonal end section
248 installation tool body opening

The invention claimed is:

1. A type of connector system, comprising:
an adapter body with a first locking component extending from the adapter body;
an annular flange extending around the adapter body and having a first connecting surface; and
a locking ring, that locking ring being constructed such that it is installed around the adapter body, said locking ring possessing a second connecting surface and a second locking component, wherein the locking ring defines a central opening receiving the adapter body and the second locking component protrudes radially inwards into the central opening of the locking ring;
said first locking component and said second locking component being constructed such that they connect together so as to position the first connecting surface a predetermined distance from the second connecting surface in response to rotation of said locking ring by an angle of 90 degrees or less than 90 degrees relative to the adapter body.

2. The connector system according to claim 1, wherein the adapter body is cylindrical; additionally
the said first locking component includes a first protruding locking section and second protruding locking section extending radially from the said adapter body.

3. The connector system according to claim 1, wherein said first locking component includes a first locking surface.

4. The connector system according to claim 3, wherein said second locking component includes a second locking surface being constructed such that this may connect with the said first locking surface.

5. The connector system according to claim 4, wherein said second locking surface includes a first section at an angle to the second connecting surface and a second section that is parallel to the second connecting surface.

6. The connector system according to claim 5, wherein said second locking surface includes a stepped section between said first section and said second section.

7. The connector system according to claim 6, wherein the connector system further includes a ribbed section adjacent to said stepped section, said ribbed section extending radially inwards into the central opening of said locking ring.

8. The connector system according to claim 1, wherein the connector system further includes a sealing component contained within said adapter body.

9. The connector system according to claim 1, wherein the central opening of the said locking ring is delimited by an axial slot constructed such that it contains said first locking component.

10. A connector system, comprising:
an adapter body that possesses a first end section and a second end section;
a flange extending around the first end of the adapter body;
a first locking component, said first locking component extending from the second end section of said adapter body and possessing a first locking surface;
a locking ring, said locking ring possessing a central opening that delimits an axial slot, said axial slot being constructed such that it contains said first locking component; and
a second locking component, said second locking component extending into said central opening and having a second locking surface being constructed such that it connects with the first locking surface of said first locking component.

11. The connector system according to claim 10, wherein this further comprises:
a first connecting surface delimited by said flange;
a second connecting surface delimited by said locking ring;
wherein, said first locking component and said second locking component are positioned such that they connect together so as to position the first connecting surface a predetermined distance from the second connecting surface in response to rotation of said locking ring by an angle of 90 degrees or less than 90 degrees relative to the adapter body.

12. The connector system according to claim 10, wherein said adapter body is cylindrical in shape; and
the first locking component includes a first protruding locking section and second protruding locking section extending radially from the said adapter body.

13. The connector system according to claim 10, wherein said locking ring delimits a central opening; and
the second locking component comprises a first protruding locking section and second protruding locking section extending radially into said central opening.

14. The connector system according to claim 10, wherein this further includes an installation tool,
said installation tool comprising: a body; and
a first dowel pin and second dowel pin extending axially from said body,
wherein said locking ring delimits a first hole and a second hole, the first hole and second hole being constructed such that said first dowel pin and said dowel second pin can fit into them.

15. The connector system according to claim 10, wherein said locking ring possesses a first end section that delimits the connecting surface; and
said second locking surface includes a first section at an angle to said connecting surface and a second section that is parallel to said connecting surface.

16. The connector system according to claim 15, wherein said second locking surface includes a stepped section between said first section and said second section.

17. The connector system according to claim 16, wherein the connector system further includes a ribbed section adjacent to said stepped section, said ribbed section extending radially inwards into the central opening of said locking ring.

18. The connector system according to claim 10, wherein the said first locking component includes a first protruding locking section and second protruding locking section extending radially from the adapter body; and
said central opening delimits the first axial slot and the second axial slot of said first protruding locking section and said second protruding locking section contained therein.

19. The connector system according to claim 18, wherein said second locking component comprises a first protruding locking section and second protruding locking section extending into said central opening.

20. A connector system, comprising:
an adaptor body having a first and second end;
a flange extending around the first end of the adaptor body;
a first locking member extending from the second end of the adaptor body and having a first locking surface;
a locking ring having a central opening defining an axial slot configured to receive the first locking member, and a first end defining an engaging surface;
a second locking member extending into the central opening and having a second locking surface that is sloped relative to the engaging surface, and a second portion that is parallel to engaging surface.

* * * * *